United States Patent [19]

Barrabee

[11] Patent Number: 4,804,328

[45] Date of Patent: Feb. 14, 1989

[54] INTERACTIVE AUDIO-VISUAL TEACHING METHOD AND DEVICE

[76] Inventor: Kent P. Barrabee, 650 Windward Cir., Tucson, Ariz. 85704

[21] Appl. No.: 878,636

[22] Filed: Jun. 26, 1986

[51] Int. Cl.$^4$ ............................................... G09B 5/06
[52] U.S. Cl. .................................... 434/308; 434/319; 434/323
[58] Field of Search ............... 434/308, 309, 310, 319, 434/157, 323

[56] References Cited

U.S. PATENT DOCUMENTS 3,744,156  7/1973  Ottassi .................................. 434/157
4,360,345  11/1982  Hon ...................................... 434/265

Primary Examiner—Leo P. Picard
Attorney, Agent, or Firm—James F. Duffy

[57] ABSTRACT

A student interactive teaching system allows the student to learn at a level of skill appropriate to the student's learning achievements and learning abilities. The student progresses at a rate selected by the student. Ample opportunity is provided for the student to support and reinforce the learning process through student commanded repetition and review. The lessons are personalized by the recording and storage of student commentary. Video masking of the visual presentation allows the student to challenge his/her understanding of the subject matter when visual cues are inhibited. So too, the inhibition of audible cues tests the students abilities to learn and repeat verbal skills, such as are required in the theatrical arts.

43 Claims, 2 Drawing Sheets

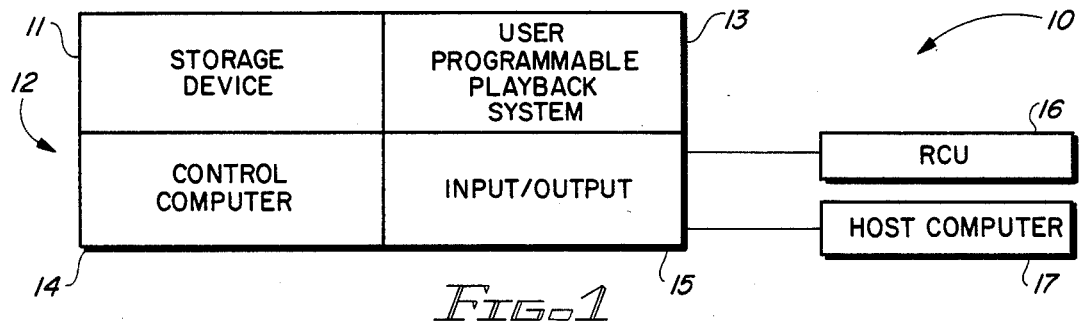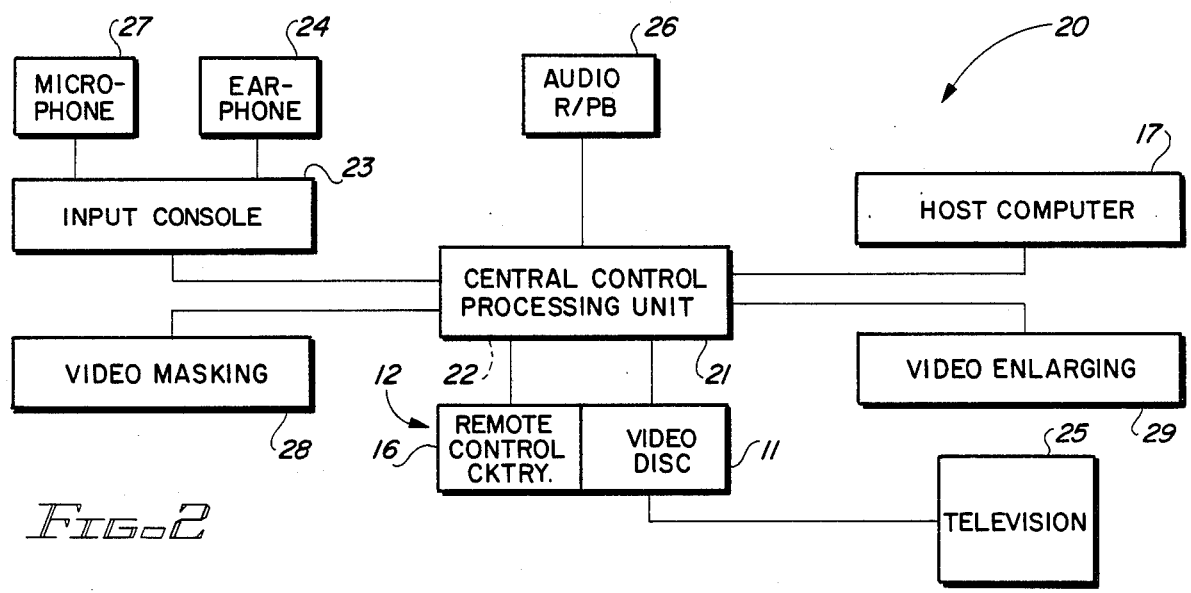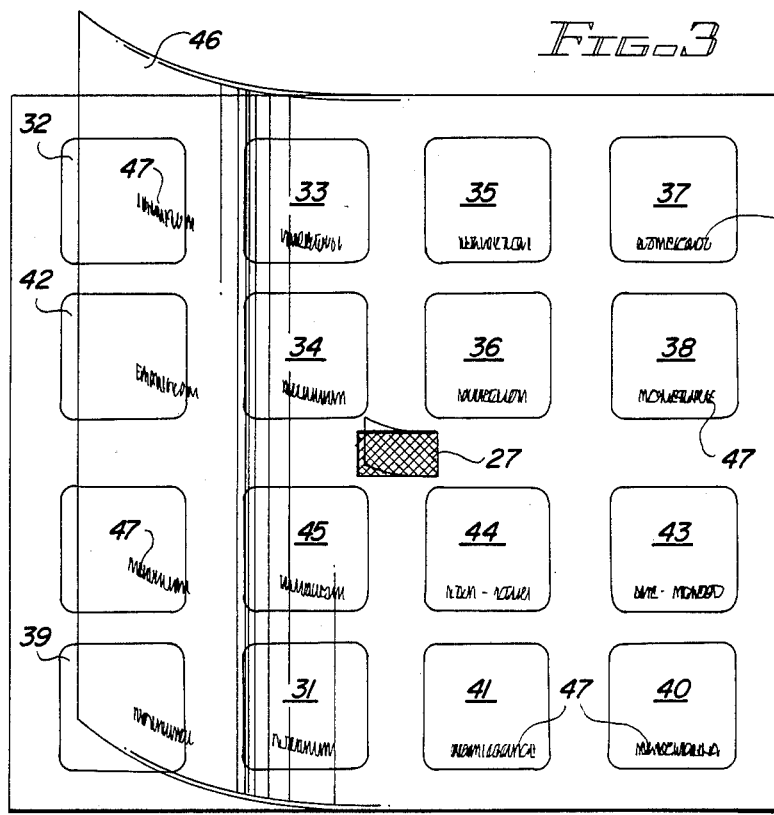

INTERACTIVE AUDIO-VISUAL TEACHING METHOD AND DEVICE

TECHNICAL FIELD

The invention relates to the field of teaching methods and teaching aids or devices. The invention particularly relates to the field of teaching in which a student interacts with a data retrieval device in which is stored lesson data in a sequence of segments each organized for simple interaction with the student.

BACKGROUND ART

Education, like science, is an ever progressing field of endeavor. It was not too long ago that an ideal learning situation was considered to be the one-classroom school with a well trained and dedicated teacher overseeing the endeavors of a group of students of varying levels of academic achievement and of varying, often widespread, ages.

The uniform classroom environment then became the norm. Students, all of approximately the same age and level of academic achievement, were grouped within a classroom in a school housing many such classrooms. Further grouping, by academic ability rather than age and mere academic achievement, became desirable. Special Education classes were established for the intellectually gifted student. Unfortunately, such programs are expensive, involve a very small pupil-to-teacher-ratio, and require the teacher to devote a great deal of personal attention to each individual student. Relatively few school systems were affluent enough to maintain such a Special Education system.

With the aid and assistance of National and Local Governments, Special Education for the mentally and physically handicapped has flourished. Special Education programs for the intellectually gifted have withered for lack of such support. Thus, while ideally a student is encouraged and provided the means for advancing academically at a pace that matches the student's abilities, it is the unfortunate truth that the bulk of our students are grouped within classes in which the level of instruction and the learning materials provided are geared to the lesser-academically-able students.

It is an object of the present invention to provide a student with the method and apparatus for learning at the student's own pace.

It is another object of the invention to provide a student with lesson data presented at the skill level at which the student is capable of learning.

Another object of the invention is to provide the student with reinforcement of as much of the lesson material as the student has actually experienced difficulty in assimilating.

It is an object of the invention that a student shall interact with a data retrieval system in a manner which encourages the achievement of the above noted objectives.

DISCLOSURE OF THE INVENTION

The invention is a method for teaching a student through the interacton of the student and an information storage and retrieval device, comprising the steps of:

a. Providing a storage device having stored therein video, audio, and digital information, for example, the storage device may comprise a videodisc.

b. Providing the storage device with a user-interactive playback system for user-determining the exact sequence and display of information output by the playback system. For the example chosen, an interactive, videodisc player would serve.

c. Providing a control computer for
  (i) controlling all phases of operation of the storage device,
  (ii) processing externally and internally stored command functions, and
  (iii) processing control and status signals internally generated within the storage device's user-interactive playback system.

Again, in keeping with the example, an interactive videodisc player typically includes an internal microcomputer to meet such needs or is controlled by an external computer.

d. Loading user-interactive programs into the computer from
  (i) programs stored in the storage device,
  (ii) manual actuation of a remote control unit coupled to the playback system, or
  (iii) programs stored or inserted into a host computer coupled to the playback system.

An interactive videodisc player, such as is disclosed, includes a remote control unit for manual actuation in commanding the internal microcomputer, and that microcomputer can be loaded with programs originating on the video disc store of data as well as from an inter-coupled host computer.

e. Providing a video display device for selectively displaying video information stored in the storage device. A video monitor coupled to the disc player will display the video stored on the videodisc.

f. Providing an audio reproduction device for selectively reproducing the audio information stored in the storage device. A simple earphone device would suffice. Of course, a television receiver would be able to both display the video and reproduce the audio stored on the disc.

g. Selectively displaying and reproducing information, stored in the storage device, in a skill-level-ordered sequence of lessons.

h. Displaying and reproducing information, stored in the storage device, in selected skill-level-ordered segments of a selected one of the lesson sequences. Because the information is stored in skill-level-ordered segments within skill-level-ordered sequences and the microcomputer permits interaction between the videodisc player and the student user, the student can select, display and reproduce lesson data at the most challenging skill level at which the student can assimilate the lesson stored on the videodisc.

i. Interacting with the displayed and reproduced information in at least one of the following ways;
  (i) Advancing from a first segment of a selected lesson sequence to a second segment. The student advances to the next data segment when he/she believes a good understanding of the data has been achieved.
  (ii) Selectedly repeating a segment. The student may wish to review a concept just presented in the lesson sequence to reinforce the learning achieved in that presentation.
  (iii) Selectedly retreating from an instant segment to an earlier segment. The student may wish not only to repeat a given segment just displayed and reproduced, as in i.(ii) above, but may decide to go back in the sequence to an earlier segment to reinforce the learning process (iv) Controlling the speed at which information is presented within a given segment.

(v) Controlling the speed at which a given sequence of segments is presented.

(vi) Controlling the amount of stored information within given segments and sequences to be displayed and reproduced at any instant. The student may elect to mask selected portions of the video display of lesson data as the student's skill-level advances. So too, the student may elect to inhibit the reproduction of audio information as a challenge to the student's skill in assimilating the lesson material. And (vii) selectedly grouping segments which may then be played in a continuous manner.

To enhance the learning process the method discloses the step of displaying an enlarged video presentation of a selected area of the instant segment originally selected by the student for display and reproduction.

The student may utilize the programming capability of the system to store information as to the segments whose presentation was repeated and to then automatedly and sequentially display and reproduce each segment repeated in steps i. (ii) and (iii) above.

The method also discloses the step of simultaneously repeating a segment while increasing the amount of information originally selected to be displayed and reproduced. Thus the student, in repeating a segment may simultaneously un-mask portions of the video presentation earlier selected to be masked and may, as well, reintroduce the audio information earlier inhibited. Alternatively, the segment may be repeated while simultaneously decreasing the amount of information displayed and reproduced by masking video originally displayed and inhibiting audio originally introduced.

Also disclosed are the steps of providing means for selectedly recording and reproducing user-spoken comments related to selected segments; and of selectedly reproducing either one of the audio information stored in the storage device related to a selected segment or the user-spoken comments related thereto.

When the method is utilized so that a student is taught to read and speak a foreign language, the following further steps are disclosed:

Storing as video on the storage device a sequence of segments of an experience of a speaker of the language to be learned.

Storing as audio on the device the words of the foreign language speaker spoken in the course of each segment of the experience.

Storing as video on the device a graphic presentation of the words spoken by the foreign language speaker.

Storing as video on the device a graphic presentation of a translation into the language of the student of the words spoken by the foreign language speaker.

Selectedly displaying so much of the stored video as the student user determines his/her skill level requires.

Selectedly reproducing so much of the stored audio as the student user determines.

And storing as video on the storage device a full face, close-up presentation of the face of the foreign language speaker as the words of the foreign language, stored as audio, are spoken.

Products resulting from the practice of the several steps of the methodology herein disclosed are also claimed herein.

Apparatus for practicing the invention is disclosed and claimed herein as a user-interactive information storage and retrieval system for use as a teaching aid in the interaction between a student and the system, comprising:

storage means for storing lesson data in the form of at least one of video, audio, and digital information and having lesson data stored therein in a sequence of segments each organized for simple interaction with a student;

a user-interactive data retrieval means coupled to the storage means for retrieving the lesson data stored therein in interaction with a student user, the data retrieval means further comprising video and audio output ports for output coupling data to video display and audio reproduction apparatus, and computer means for controlling all phases of operation of the retrieval means, and processing externally and internally stored command functions and internally generated control and status signals;

video display and audio reproduction apparatus coupled respectively to the video and audio output ports of the data retrieval means; and a video masking generator coupled to the data retrieval means for masking selected portions of the video lesson data output by the retrieval means to the video display apparatus in interactive response to a student user.

The disclosed and claimed apparatus also includes means for selectedly recording user spoken comments related to selected segments of a sequence of lesson data; and means coupled to the data retrieval means, the recording means, and the audio reproduction apparatus for selectedly reproducing either one of the stored audio information related to a selected lesson data segment or the user spoken comment related to the selected segment.

The system is disclosed as having a central processing unit intercoupling each element of the system and having a control program for controlling all operational steps of the interaction between a user and the data retrieval means. An input command console coupled to the central processing unit has means therein for user selection of commands to functionally control the control program of the central processing unit. Video display enlargement means are coupled to the central processing unit for selectedly displaying on the video display apparatus an enlarged presentation of a selected portion of a selected segment of the lesson data sequences.

BRIEF DESCRIPTION OF THE DRAWINGS

FIG. 1 is a block diagram of an interactive data retrieval or playback system.

FIG. 2 is a block diagram of an interactive teaching system of which the playback system of FIG. 1 is a part.

FIG. 3 conceptually represents an input command console through which the user functionally commands the operation of the teaching system of FIG. 2.

FIG. 5 conceptually represents the video presentation finding use in teaching a physical activity, such as tool usage, sports, or the like.

BEST MODE FOR CARRYING OUT THE INVENTION

Figure 4:
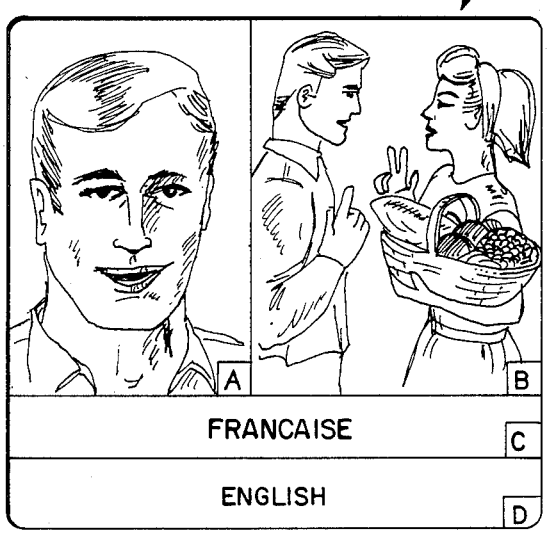
FIG. 4 is a conceptual representation of a video presentation format for the teaching of a foreign language.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

An interactive playback, or data retrieval, system 10 is presented as a block diagram in FIG. 1. The system retrieves data from a data storage device 11, hereinafter alternatively referred to as videodisc 11. The data retrieval device 12, is, in the preferred embodiment here disclosed, an interactive videodisc player 12. Videodisc 11 provides a storage medium for video, audio, and digital information to be processed by disc player 12. Data are stored in the form of reflective impressions within disc 11, which impressions are scanned by a laser beam in the interactive playback system 13 of disc layer 12 in order to read the data and output it from player 12.

The optical signal recovered by the laser beam is supplied to a photodiode which converts the optical data to electrical signals which are further processed by playback system 13 and ultimately converted to video and VHF signals for driving a television monitor or a conventional television receiver. Audio output signals are available for input to audio reproduction equipment. In addition, an audio signal is available as part of the modulated RF video signal for use with a standard television receiver.

An internal microcomputer 14 controls all phases of operation of player 12, processing both externally and internally stored command functions and internally generated control and status signals. Microcomputer 14 makes possible the great variety of play, search, and display functions of which player 12 is capable.

Because player 12 is programmable, the exact sequence and display of information presented to the viewer can be predetermined by a program designer. Audio visual messages can be developed for a wide variety of applications and tailored under program control. Significantly, programs can be constructed to permit viewer interaction with the displayed material.

By entering numerical responses from remote control unit (RCU) 16, the user may select particular topics to display, respond to questions and receive information appropriate to user response.

Actually, programs may be loaded into microcomputer 14 in any one of at least three ways: from programs coded on videodisc 11, manually from RCU 16, or under the control of attached host computer 17. I/O device 15 couples player 12 and microcomputer 14 to external control devices such as RCU 13 and host computer 17.

The innovative interactive teaching system 20 is set out as a block diagram in FIG. 2. An important part of the system is the videodisc data storage device 11 and the videodisc player data retrieval device 12. But the heart of the system is the central control processing unit 21 which comprises a microprocessor controlled logic center for handling all of the intelligence functionings of the unit, including communication with external devices. Central control processing unit (CPU) 21 functions from a program 22 stored in a non-volatile memory within the unit.

The user commands the functioning of program 22 of CPU 21 through the manipulation of signal controls, for example simple manually operated switching devices, at the input command console 23.

CPU 21 detects data from input command console 23 in the form, for example, of changes in an input code caused by user activation of switches on command console 23. These data, when detected, cause CPU 21 to initiate operations in other areas of the system.

CPU 21 also transmits encoded data back to command console 23 to activate visual status signal indicators, e.g. LED's, on the surface of console 23.

In addition, CPU 21 communicates in two directions with videodisc player 12. Videodisc player 12 has an RS 232C communication port for communicating with CPU 21 in ASCII format; while CPU 21 communicates with player 12 in a manner compatible with the wired remote control unit 16.

To provide added programming flexibility, beyond that available to CPU 21 through program 22, a host computer 17 may be utilized and coupled into the system through CPU 21. Such added flexiblity would, for example, provide for graphic overlays of the stored video presentation.

For private listening to the audio information retrieved from videodisc 11, earphones 24 may be coupled conveniently to command console 23 through which itself that audio is coupled. The video information is presented on TV monitor 25, which may be a standard TV receiver, in which case, the audio information would be available there for reproduction as well.

As part of the learning process, it will often be appropriate for the student to add commentary to the video and audio information presented as part of any given lesson. Thus, when a student is studying a foreign language and the lesson presented includes a reproduction of the voice of a speaker fluent in that language, it would be advisable for the student to attempt to mimic the speaker. To enhance the learning process, it would be well to reproduce the student's attempt at mimicry so that the student may hear that attempt in close juxtaposition to a second reproduction of the foreign speaker's vocalization. To this end, audio recording and playback apparatus 26 is provided and coupled to CPU 21. And microphone 27, electrically coupled to recorder 26 through CPU 21, is emplaced on command console 23.

CPU 21 functions to control recording and playback apparatus 26 in its mechanical actuation and in indexing the recorded student comment to that segment of the lesson data presented at the time the comment was made.

In areas of instruction in addition to that of language study, the student will want to add his/her own comment to the lesson material to reinforce the learning process and to record observations making the lesson more of a personal experience and therfore more memorable. The system, via recorder 26 provides this capability.

The lesson material is stored in videodisc 11 in a series of skill-level-ordered sequences. Each such sequence, in turn, is comprised of a skill-level-ordered series of segments. The student selects the skill level at which the lesson presentation shall begin. Then, as the student achieves greater skill in the subject matter of the lesson, the student, of his/her own volition, advances the lesson presentation to a higher skill level.

Since each lesson presentation is comprised of both audible and visual instructional information, it is appopriate to inhibit or mask out portions of such audible and visual information at the higher skill levels of the lesson presentation. Thus, a student may be required to respond to an audio prompt when there are no visual cues being presented to aid him/her. Similarly, in learning an acting scenerio, the student may be presented with a visual enactment of the scene and be expected to respond with the actor's words even though those words are not audibly reproduced by the character the student is studying to play.

Inhibiting the reproduction of selected portions of audio or of all of the video presentation is readily achieved. A simple switching arrangement under the control of CPU 21 will suffice. To inhibit or mask only a selected portion of the video presentation, however, requires the use of video masking generator 28.

Video masking generator 28 provides a video mask of predetermined size and position to alternately conceal or reveal, in any combination, video data stored on disc 11. The masked areas are activated and deactivated by the user initiating commands at input command console 23. The positions and sizes of the video masked areas may be fixed by program 22 in CPU 21. Or they may vary with cooperative communication between and among videodisc 11 and the digital data stored there, microcomputer 14 in videodisc player 12, and program 22 in CPU 21.

In the presently preferred embodiment, masking generator 28 generates a video masking signal which, when displayed on the TV screen, masks out the video of the lesson presentation. Masking generator 28 also comprises switching circuitry which, responsive to program command initiated by the user at command console 21, defines areas of the screen in which the masking signal will be blanked and the lesson video will be displayed for viewing.

By selectively masking the video presentation and inhibiting the audio reproduction, the depth and detail of the instructional material displayed and reproduced varies inversely with the degree of skill and knowledge of the student.

Video enlarger 29 provides enlarged detail enhancement of a user selected portion of the lesson's video presentation. The need for such enhancement is to be anticipated by the programmer when lesson data are stored on videodisc 11. A greater number of pixels of video information must be available for retrieval from disc 11 than would normally be utilized on the TV screen at normal raster scan rates. Upon initiation of user command at command console 23, video enlarger 29 instructs videodisc player 12 through program 22 of CPU 21 to output additional stored video data such that an enlarged presentation of a portion of the original presentation will appear on the TV screen in enhanced detail as a result of supplementation of the video content in that enlarged portion.

Computerized video enhancement can be employed in those instances in which the necessary additional video information is not in storage on videodisc 11.

To make use of the system, the user operates switches on the input command console 23, which, in turn, send commands to program 22 in CPU 21. Program 22 is stored in a non-volatile memory device such as an Erasable Programmable Read Only Memory (EPROM). The concept of input command module 23 is illustrated in FIG. 3. Each numbered switch, 31-45, commands a selected program function.

Because the nomenclature for the various functions may change with the lesson videodisc selected, and because a given switch actuation may call forth a different function with different videodiscs, as determined by the differing digital data stored on videodiscs 11, an overlay sheet 46, peculiar to a given topical lesson, is provided. Specific nomenclature 47 identifying the switch function associated with the particular lesson being presented is imprinted on overlay 46. The switches may be illuminated to indicate their status. Light emitting diodes (LED's) may also be employed as status indicators. A numerical display representative, for example, of the relative skill level of lesson presentation may also appear on the face of command console 23.

Some typical functions will be disclosed here with generic descriptors. As noted above, the actual nomenclature used may vary with the topical lesson presentation.

A command originating at switch 31 causes the entire system to be powered up. Thus, one does not have to actuate individual switches on each piece of equipment in order to turn the system "on" or "off".

The student will desire that teaching proceed at a level which is challenging, but one which does not overwhelm the student because its presentation far exceeds the level the student has already achieved. The student will actuate switch 32 to set the skill level at which the the lesson will be presented.

Depending again on the student's knowledge of the subject matter, switch 33 will be employed to initiate the command which selects the desired lesson sequence from among the many lesson sequences stored on videodisc 11. Each lesson sequence is organized into segments many of which provide a question, command or comment designed to elicit one or more appropriate responses from the student. Switch 34 selects the segment of the chosen sequence which is presented to the student.

The lesson advances from segment to segment at the rate desired by the student. Switch 35 advances the presentation. Having advanced to the next segment, the student may have second thoughts about all he/she had gleaned from the earlier segment's presentation. Switch 36 allows the student to repeat one or more of the earlier segments, depending on the number of times the switch is successively actuated.

By user selection, Repeat switch 36 will cause the simultaneous repeat of a segment at successively increasing skill levels. Thus, the amount of information originally selected for display and reproduction is reduced for each successive actuation of Repeat switch 43; and portions of the video presentation originally selected for disclosure will be masked, while audio originally reproduced will be inhibited.

Switches 37, Slow Advance, and 38, Slow Repeat, serve functions similar to those of switches 35 and 36; Advance and Repeat, respectively. However, with Slow (Advance or Repeat), all the video action is presented in slower motion, and the audio is expanded so that the vocal presentation is slowed without distortion. The slowed video is especially appropriate to teaching manual skills, while the audio expansion aids the student in learning a foreign language or a new technical vocabulary.

The student may utilize microphone 27 to record personal impressions or notes relative to a given lesson segment, or to record the student's attempts to mimic with exactness the words spoken in the audio portion of the lesson. Switch 39 commands actuation of the recording function of record/playback apparatus 26. The student exercises switch 40 to playback the recorded student commentary. The student's recording may be compared immediately to that of the stored lesson audio by actuation of switch 41 which causes the lesson segment's audio to be played back. The student may re-record his/her commentary or attempts at mimicry as the need to personalize the lesson in terms of the student's improving skill level dictates.

Switch 42 commands the sound level at which the lesson audio is reproduced.

If the student fears he/she has exceeded the optimal skill level for learning, the student may call for "Help" by exercising switch 43. Switch 43 repeats a segment one or more times depending on the number of successive actuations of the switch. In this sense, it is similar to Repeat switch 36. However, upon exercise of Help switch 43, the system also retreats successively to each lower skill level to further support the learning process.

After using Help switch 43, the first use of Forward switch 35 will simultaneously repeat the instant segment and restore masking removed by use of Help switch 43, allowing the student to test his remediated skills.

Upon completion of a learning sesson, or during the course of a lesson, the student may wish to "Review" those parts of the lesson in which the student experienced earlier difficulties. By actuating command switch 44, each segment of the lesson which the student had earlier repeated will now be sequentially presented to the student to reinforce the new learning skills achieved.

The student may wish to verify his/her understanding of a lesson sequence. For this purpose, switch 45 commands that the selected sequence be presented to the student at one of the more basic skill levels stored in videodisc 11. This frequently entails display of video masked at the more skilled levels.

FIG. 4 represents the video presentation of a segment of a lesson sequence which involves the student in learning a foreign language. The top half of the screen is divided into two squares, A and B. The lower half of the screen contains two rectangular presentations, C and D. Presentation A is a full face view of the foreign language speaker. The student thus sees the speaker's facial expression and the formation of the speaker's lips as the foreign language is spoken.

Frame B presents the speaker in the environment in which the lesson sequence takes place. In frame B the speaker is seen interacting with other foreign language speaking persons in an environment such as the post office, the market place, the railroad station, or the like. As each person who appears in frame B speaks, that person's face is presented in frame A.

In frame C, an alphagraphic representation of the words spoken by the foreign language speaker appears. Since the words are reporeded audibly as well, the visual presentation of frame C reinforces the audio presentation and aids the student in sounding out the words spoken as well as improving the student's ability to read the foreign language.

The student's native language, or one in which the student is already proficient is presented graphically in frame D, providing a translation of the speaker's words so the student may understand them and comprehend the scene and personal interactions shown in frame B.

All of the command-types discussed with respect to input command console 23 may be employed with the foreign language lesson. As an example of how the skill level selection would affect the presentation of FIG. 1, consider that FIG. 1, as illustrated, represents the basic beginner's learning level. Remember too that the speaker's voice is being audibly reproduced as each segment of the action sequence takes place.

When the student selects the next higher skill level, e.g., Level 2, video masking generator 28 is switched such that the student's graphic translation, frame D is masked. The student then must rely on his/her memory of the foreign language to understand what it is that the speaker is saying, although the visual cues provided in frames A, B and C will aid that understanding.

Advancing to Level 3, frame C, the graphic presentation of the speaker's words is masked from the screen. The action shown in frame B still provides strong cues as to what is being said.

At skill level 4, frames B, C and D are masked and only minimal visual cues are provided the student by the presentation of frame A. A remembered facial expression may be all that the student has to trigger an understanding of what it is the foreign language speaker has said.

Only the audio is available to the student in skill level 5. Of course, the student can always take recourse in commands such as Repeat, Slow Repeat, Slow Forward, and Help to support the learning of new material and to reinforce the learning already achieved.

Figure 5:
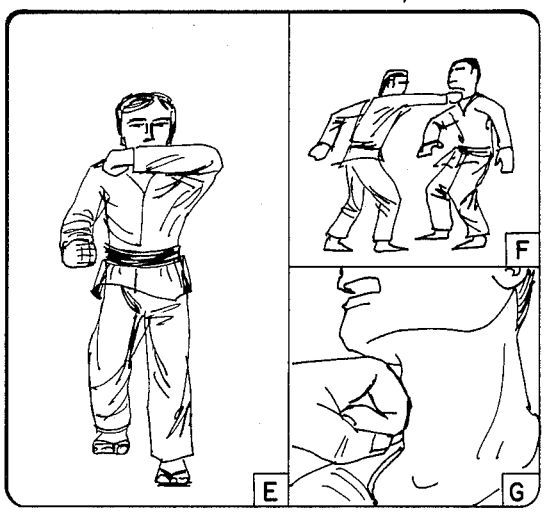

FIGS. 5, 6 and 7 illustrate, in a small way, the variety of expository presentations available. FIG. 5 illustrates a segment of a Karate lesson. Frame E depicts the front view of a person skilled in Karate as the person performs one segment of a sequence of moves such a Block, Strike, Block, Kick, Block. In frame F the same person is seen from one side as that person interacts with another person or thing. A close up of the result of the action is shown in frame G.

If the lesson of FIG. 5 involved another sport, frame E might depict a frontal view of a tennis player or a golfer. Frame F would then illustrate a side view of the player or golfer interacting with the ball. Frame G would show in enlarged detail the angle of attack of the tennis racket or golf club as it is brought into contact with the ball.

A similar series of frames would prove suitable to teach one to work a machine or manipulate a tool.

Figure 6B:
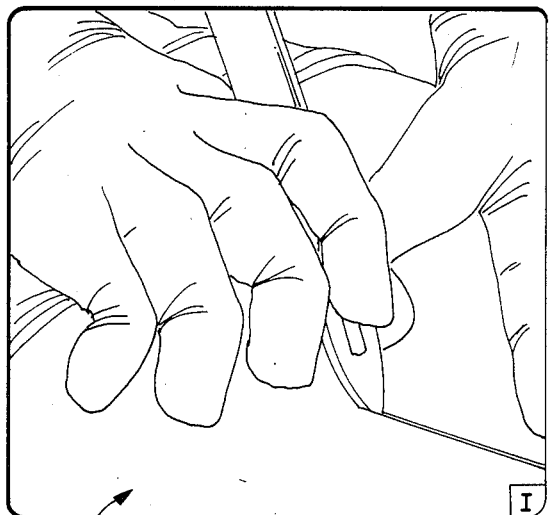
FIGS. 6A and 6B presents a conceptual video display format for teaching a detailed procedure, such as a surgical operation, in which the student user of the system selects a desired area in the overall display for enlarged presentation in a detailed display.
Figure 6A:
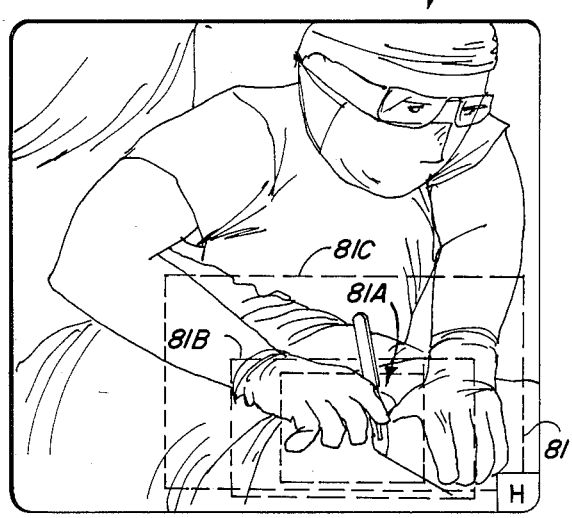

In FIG. 6A a skilled manual procedure is depicted, e.g., a surgical operation. The student may select, say as part of the skill level selection, an area 81A, 81B, or 81C to be enlarged and presented in greater detail. Such selection commands video enlarger 29 to utilize the enhanced video data content stored on videodisc 11 when the particular lesson was prepared and programmed.

FIG. 6B illustrates the enlarged detailed presentation available to the student upon selection of area 81A for enlargement.

FIGS. 6A and 6B may be shown individually in full screen format or simultaneously on a single screen.

Figure 7A:
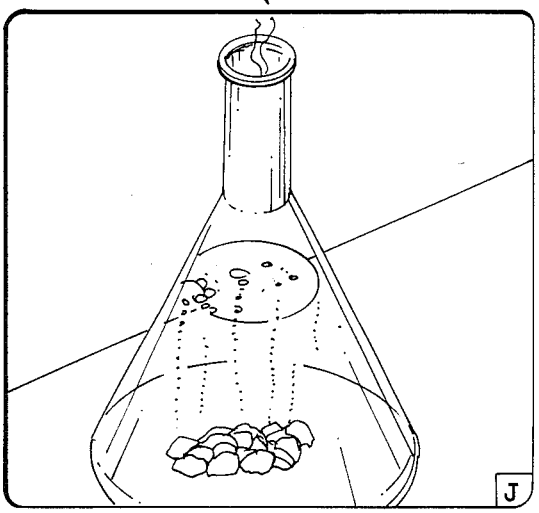
FIGS. 7A and 7B represents conceptually the video format for displaying a process in progress, such as a chemical reaction or the like, and includes an overall view of the process, as well as a close-up display of the immediate area in which process activity is taking place. The elapsed time of the process may be displayed as illustrated.
Figure 7B:
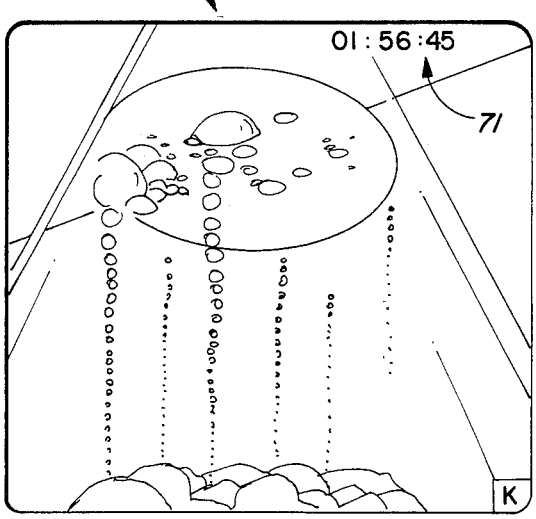

So too FIGS. 7A and 7B may be shown individually or at the same time on a single screen. FIGS. 7 illustrate the working of a process, for example a chemical process. It could as well depict a natural process such a the birth of a volcano on the ocean floor. The process is shown in FIG. 7A from the perspective an observer might safely assume. FIG. 7B presents an enlarged detailed presentation from an observation point that would normally be unsafe for the observer to approach or which could not be observed except with the use of supplementary recording devices. The enlarged presentation of FIG. 7B is programmed into the data stored in the videodisc lesson and is not otherwise selectable by the student in the manner of the selection of areas 81A-C of FIGS. 6.

An elapsed time reference 71 can be displayed to lend an appreciation for the time required for processes recorded in elapsed-time-sequences as is sometimes done to illustrate the growth of a plant from seed to flower to fruit.

What has been described is a student interactive teaching system which allows the student to learn at a level of skill appropriate to the student's learning achievements and learning abilities. The student progresses at a rate selected by the student. Ample opportunity is provided for the student to reinforce the learning process through student commanded repetition and review. The lessons may be personalized by the recording and storage of student commentary. Video masking of the visual presentation allows the student to challenge his/her understanding of the subject matter when visual cues are inhibited. So too, the inhibition of audible cues tests the students abilities to learn and repeat verbal skills, such as are required in the theatrical arts.

To emphasize the controlling role of the student, as set forth in the preceeding paragraph and throughout this specification, claims have been appended hereto setting forth the student-user's control of the interactions of the student with the teaching system in making operative inputs, determinations, and selections. For purposes of emphasis and definition, it is here noted that wherever a claim makes reference to student/user control in making operative inputs, determinations, and selections in interacting with the teaching system and practicing its methodology, such reference shall be clearly understood as meaning that such student/user activities are the independent acts of the student/user, freely conceived and initiated by the student/user and made without pre-programmed system coercion of the student/user.

Those skilled in the art will conceive of other embodiments of the invention which may be drawn from the disclosure herein. To the extent that such other embodiments are so drawn, it is intended that they shall fall within the ambit of protection provided by the Claims herein.

Having described my invention in the foregoing description and drawings in such a clear and concise manner that those skilled in the art may readily understand and practice the invention, that which I claim is:

1. A method for teaching a student through the student controlled interaction of the student and an information storage and retrieval device, comprising the steps of:
   a. providing a storage device having stored therein at least one of video, audio, and digital information;
   b. providing the storage device with a user-interactive playback system for student user-determining the exact sequence and display of information output by the playback system;
   c. providing a control computer for
      (i) controlling all phases of operation of the storage device,
      (ii) processing externally and internally stored command functions, and
      (iii) processing control and status signals internally generated within the storage device's user-interactive playback system;
   d. loading student controlled, student user interactive programs into said computer from at least one of
      (i) programs stored in the storage device,
      (ii) manual actuation of a remote control unit coupled to said playback system, and
      (iii) programs stored in a host computer coupled to said playback system;
   e. providing a video display device for selectively displaying video information stored in the storage device;
   f. providing an audio reproduction device for selectively reproducing the audio information stored in the storage device;
   g. selectively displaying and reproducing information, stored in said storage device, in a student determined skill-level-ordered sequence of lessons;
   h. displaying and reproducing information, stored in said storage device, in student selected skill-level-ordered segments of a selected one of said lesson sequences;
   i. interacting with said displayed and reproduced information in at least one of the following ways under student control:
      (i) advancing from a first segment of a selected lesson sequence to a second segment,
      (ii) selectedly repeating a segment,
      (iii) selectedly retreating from an instant segment to an earlier segment,
      (iv) controlling the speed at which information is presented within a given segment,
      (v) controlling the speed at which a given sequence of segments is presented,
      (vi) controlling the amount of stored information within given segments and sequences to be displayed and reproduced at any instant; and
      (vii) selectedly grouping segments which may then be presented in a continuous manner.

2. The method of claim 1 further comprising the step of displaying an enlarged video presentation of a selected area of the instant segment selected for display and reproduction.

3. The user-interactive information storage and retrieval system produced by the practice of the method of claim 2.

4. The method of claim 1 further comprising the step of automatedly and sequentially displaying and reproducing each segment repeated in step i. (ii) and (iii) of claim 1.

5. The method of claim 4 further comprising the step of simultaneously repeating a segment while changing the amount of information originally selected to be displayed and reproduced.

6. The user-interactive information storage and retrieval system produced by the practice of the method of claim 4.

7. The method of claim 1 in which a student is to be taught to read, speak and aurally comprehend a foreign language comprising the further steps of:

storing as video on the storage device a sequence of segments of an experience of a speaker of the language to be learned;

storing as audio on said device the words of the foreign language speaker spoken in the course of each segment of the experience;

storing as video on said device a graphic presentation of the words spoken by the foreign language speaker;

storing as video on said device a graphic presentation of a translation into the language of the student of the words spoken by the foreign language speaker;

selectedly displaying so much of the stored video as the student user determines his/her skill level requires; and selectedly reproducing so much of the stored audio as the student user determines.

8. The user-interactive information storage and retrieval system produced by the practice of the method of claim 7.

9. The method of claim 7 comprising the further step of storing as video on the storage device a full face, close-up presentation of the face of the foreign language speaker as the words of the foreign language, stored as audio, are spoken.

10. The user-interactive information storage and retrieval system produced by the practice of the method of claim 9.

11. The method of claim 1 further comprising the steps of:

providing means for selectedly recording and reproducing user-spoken comments related to selected segments; and selectively reproducing at least one of the audio information stored in the storage device related to a selected segment and the user-spoken comments related thereto.

12. The user-interactive information storage and retrieval system produced by the practice of the method of claim 11.

13. The method of claim 1 further comprising the steps of:

automatedly and sequentially displaying and reproducing each segment repeated in step i. (ii) and (iii) of claim 1;

simultaneously repeating a segment while changing the amount of information originally selected to be displayed and reproduced;

providing means for selectedly recording and reproducing user-spoken comments related to selected segments; and selectively reproducing at least one of the audio information stored in the storage device related to a selected segment and the user-spoken comments related thereto.

14. The method of claim 13 in which a student is to be taught to read, speak and aurally comprehend a foreign language comprising the further steps of:

storing as video on the storage device a sequence of segments of an experience of a speaker of the language to be learned;

storing as audio on said device the words of the foreign language speaker spoken in the course of each segment of the experience;

storing as video on said device a graphic presentation of the works spoken by the foreign language speaker;

storing as video on said device a graphic presentation of a translation into the language of the student of the words spoken by the foreign language speaker;

selectedly displaying so much of the stored video as the student user determines his/her skill level requires; and selectedly reproducing so much of the stored audio as the student user determines.

15. The method of claim 14 comprising the further step of storing as video on the storage device a full face, close-up presentation of the face of the foreign language speaker as the words of the foreign language, stored as audio, are spoken.

16. The method of claim 1 further comprising the steps of:

automatedly and sequentially displaying and reproducing each segment repeated in step i. (ii) and (iii) of claim 1;

simultaneously repeating a segment while changing the amount of information originally selected to be displayed and reproduced;

providing means for selectedly recording and reproducing user-spoken comments related to selected segments;

selectively reproducing at least one of the audio information stored in the storage device related to a selected segment and the user-spoken comments related thereto; and displaying an enlarged video presentation of a selected area of the instant segment selected for display and reproduction.

17. The method of claim 1 further comprising the step of simultaneously repeating a segment while changing the amount of information originally selected to be displayed and reproduced.

18. The user-interactive information storage and retrieval system produced by the practice of the method of claim 17.

19. The method of claim 17 in which a student is to be taught to read, speak and aurally comprehend a foreign language comprising the further steps of:

storing as video on the storage device a sequence of segments of an experience of a speaker of the language to be learned;

storing as audio on said device the words of the foreign language speaker spoken in the course of each segment of the experience;

storing as video on said device a graphic presentation of the words spoken by the foreign language speaker;

storing as video on said device a graphic presentation of a translation into the language of the student of the words spoken by the foreign language speaker;

selectedly displaying so much of the stored video as the student user determines his/her skill level requires; and selectedly reproducing so much of the stored audio as the student user determines.

20. The method of claim 19 comprising the further step of storing as video on the storage device a full face, close-up presentation of the face of the foreign language speaker as the words of the foreign language, stored as audio, are spoken.

21. The user-interactive information storage and retrieval system produced by the practice of the method of claim 1.

22. A method of teaching a student through the student controlled interaction of the student and an information storage and retrieval device, comprising the steps of:
   a. storing lesson data in the form of video, audio, and digital information on a videodisc in a sequence of segments each organized for simple interaction with a student;
   b. providing a user-interactive videodisc player with outputs coupled to video display and audio reproduction devices and having an internal microcomputer for controlling all phases of said videodisc player operation, and processing externally and internally stored command functions and internally generated control and status signals;
   c. providing a central control processing unit as a system traffic interconnection point having a control program to control all operational steps for teaching a student by student-interaction with the videodisc player;
   d. providing an input command console coupled to said central control processing unit for student user selection of the commands functionally controlling the control program within said processing unit;
   e. coupling said central control processing unit to said videodisc player so that the control program of said processing unit controls the microcomputer in the player in accord with commands student-user-input to the input command console;
   f. coupling a video masking generator to said central control processing unit for masking selected portions of the displayed video output of said videodisc player under user control of said input command console; and
   g. extracting lesson data stored on said videodisc by playing said videodisc on said videodisc player and using said input command console to interact with each selected segmented sequence visually displayed and audibly reproduced for the user as a result.

23. The user-interactive information storage and retrieval system produced by the practice of the method of claim 22.

24. The method of claim 22 further comprising the step of interacting with said displayed and reproduced information in at least one of the following ways under student control:
   (i) advancing from a first segment of a selected lesson sequence to a second segment,
   (ii) selectedly repeating a segment,
   (iii) selectedly retreating from an instant segment to an earlier segment,
   (iv) controlling the speed at which information is presented within a given segment,
   (v) controlling the speed at which a given sequence of segments is presented,
   (vi) controlling the amount of stored information within given segments and sequences to be displayed and reproduced at any instant; and
   (vii) selectedly grouping segments which may then be presented in a continuous manner.

25. The user-interactive information storage and retrieval system produced by the practice of the method of claim 24.

26. The method of claim 24 further comprising the step of displaying an enlarged video presentation of a selected area of the instant segment selected for display and reproduction.

27. The user-interactive information storage and retrieval system produced by the practice of the method of claim 26.

28. The method of claim 24 further comprising the step of automatedly and sequentially displaying and reproducing each segment repeated in step i. (ii) and (iii) of claim 16.

29. The method of claim 28 further comprising the step of simultaneously repeating a segment while changing the amount of information originally selected to be displayed and reproduced.

30. The user-interactive information storage and retrieval system produced by the practice of the method of claim 29.

31. The method of claim 29 further comprising the steps of:
   providing means for selectedly recording and reproducing user-spoken comments related to selected segments; and
   selectively reproducing at least one of the audio information stored in the storage device related to a selected segment and the user-spoken comments related thereto.

32. The user-interactive information storage and retrieval system produced by the practice of the method of claim 31.

33. The method of claim 31 in which a student is to be taught to read, speak and aurally comprehend a foreign language comprising the further steps of:
   storing as video on the storage device a sequence of segments of an experience of a speaker of the language to be learned;
   storing as audio on said device the words of the foreign language speaker spoken in the course of each segment of the experience;
   storing as video on said device a graphic presentation of the words spoken by the foreign language speaker;
   storing as video on said device a graphic presentation of a translation into the language of the student of the words spoken by the foreign language speaker;
   selectedly displaying so much of the stored video as the student user determines his/her skill level requires; and
   selectedly reproducing so much of the stored audio as the student user determines.

34. The user-interactive information storage and retrieval system produced by the practice of the method of claim 33.

35. The method of claim 33 comprising the further step of storing as video on the storage device a full face, close-up presentation of the face of the foreign language speaker as the words of the foreign language, stored as audio, are spoken.

36. The user-interactive information storage and retrieval system produced by the practice of the method of claim 35.

37. A user-interactive information storage and retrieval system for use as a teaching aid in the student controlled interaction between a student and the system, comprising:

storage means for storing lesson data in the form of at least one of video, audio, and digital information and having lesson data stored therein in a sequence of segments each organized for simple interaction with a student;

a user-interactive data retrieval means coupled to said storage means for retrieving the lesson data stored therein in student controlled interaction with a student user, said data retrieval means further comprising video and audio output ports for output coupling data to video display and audio reproduction apparatus; and computer means for controlling all phases of operation of said retrieval means, and processing externally and internally stored student controlled command functions and internally generated control and status signals;

video display and audio reproduction apparatus coupled respectively to said video and audio output ports of said data retrieval means; and a video masking generator coupled to said data retrieval means for masking selected portions of the video lesson data output by said retrieval means to said video display apparatus in a student controlled interactive response to a student user.

38. The system of claim 37 further comprising:

means for selectedly recording user spoken comments related to selected segments of a sequence of lesson data; and means coupled to said data retrieval means, said recording means, and said audio reproduction apparatus for selectedly reproducing at least one of stored audio information related to a selected lesson data segment and the user spoken comment related to said selected segment.

39. The system of claim 38 further comprising a central processing unit intercoupling each element of the system and having a student controlled control program for controlling all operational steps of the interaction between a student user and the data retrieval means.

40. The system of claim 39 further comprising an input command console coupled to said central processing unit and having means therein for student user selection of commands to functionally control said control program of said central processing unit.

41. The system of claim 40 further comprising video display enlargement means coupled to said central processing unit for selectively displaying on said video display apparatus an enlarged presentation of a selected portion of a selected segment of said lesson data sequences.

42. The system of claim 41 wherein said storage means comprises a videodisc.

43. The system of claim 42 wherein said user-interactive data retrieval means comprises a videodisc player.

* * * * *